United States Patent [19]

Tavtigian

[11] Patent Number: 4,656,476

[45] Date of Patent: Apr. 7, 1987

[54] WARNING DEVICE FOR GOLF CARTS

[76] Inventor: Richard Tavtigian, 12 Exmoor, Toledo, Ohio 43615

[21] Appl. No.: 769,089

[22] Filed: Aug. 26, 1985

[51] Int. Cl.$^4$ .................. G01S 13/48; G01S 17/08; A63B 57/00

[52] U.S. Cl. .................. 340/993; 273/32 R; 280/DIG. 5; 340/323 R; 340/539

[58] Field of Search .............. 340/988, 993, 539, 541, 340/565, 323 R, 933, 825.36, 568, 571, 540, 991, 992, 901; 364/444, 458, 450, 460, 424; 343/7 VC, 7 VM, 5 PD; 434/252; 280/DIG. 5; 273/183 R, 213, 32 R, 176 R; 73/178 R; 342/70–72, 27, 118

[56] References Cited

U.S. PATENT DOCUMENTS

| | | | |
|---|---|---|---|
| 2,131,291 | 9/1938 | Maust | 340/541 |
| 2,836,253 | 5/1958 | Lovell | 180/216 |
| 3,472,333 | 10/1969 | Loewenstern, Jr. | 180/167 |
| 3,675,190 | 7/1972 | Auer, Jr. et al. | 340/943 |
| 4,208,658 | 6/1980 | Fujiki et al. | 343/7 VM |
| 4,225,226 | 9/1980 | Davidson et al. | 364/456 |
| 4,229,724 | 10/1980 | Marcus | 364/460 |
| 4,242,668 | 12/1980 | Herzog | 340/539 |
| 4,297,684 | 10/1981 | Butter | 340/565 |
| 4,371,934 | 2/1983 | Wahl et al. | 364/444 |
| 4,480,310 | 10/1984 | Alvarez | 340/988 |

Primary Examiner—James L. Rowland
Assistant Examiner—Brent A. Swarthout
Attorney, Agent, or Firm—Marshall & Melhorn

[57] ABSTRACT

A warning device for indicating a position of a golf cart on a golf course with respect to a restricted area includes a transmitter of an energy wave and a receiver of the energy wave. In one embodiment, the receiver is mounted on the golf cart and the transmitter is located at the restricted area. In another embodiment, both the transmitter and receiver are mounted on the golf cart and a reflector for the energy wave is mounted at the restricted area. The energy wave contains information about the position of the golf cart with respect to the restricted area such that an indication of the position can be generated by lighting a lamp, or by generating a sound, or by generating a digital visual display.

14 Claims, 4 Drawing Figures

WARNING DEVICE FOR GOLF CARTS

BACKGROUND OF THE INVENTION

The present invention relates to guidance systems for golf carts in general and in particular to a device for warning the driver of a golf cart upon approach to a restricted area.

The maintenance of a golf course is an expensive, time consuming job which is made more difficult by the damage done by golf carts which have been driven into areas of the golf course where they should not have been.

Several prior art devices have been directed to providing remote controlled golf carts for carrying either the golf equipment or the equipment and the player. For example, U.S. Pat. No. 2,836,253 discloses an automatic golf caddie vehicle which can be manually driven to a location and then remotely controlled by the player. Several forms of control devices are disclosed including audio, light and radio.

U.S. Pat. No. 3,472,333 discloses a remote control wheeled golf club carrier which is guided to travel to such points as the operator desires to hit a golf ball. When the cart reaches the desired position, the cart indicates to the operator how many yards distant it is.

Neither of the above described carts solves the problem of driving on an area of the golf course where such driving should not be done. Both of these carts rely upon the ability of the operator to recognize those areas where the cart should not be driven just as in the case of a manually operated golf cart. The present invention solves this problem by automatically recognizing restricted areas and providing a signal or indication to the operator when approaching such areas. The system according to the present invention can further change the signal to the operator in dependence upon the distance from the restricted area to provide such information to the operator.

DESCRIPTION OF THE PREFERRED EMBODIMENT

Figure 1:
FIG. 1 is a block diagram of an information transmission system for use in the present invention.

There is shown in FIG. 1 a block diagram of an information transmission system for use in the present invention. A transmitter 10 generates a wave of energy 11 which carries information. The energy wave 11 is intercepted by a receiver 12 which generates a response to the information.

Figure 2:
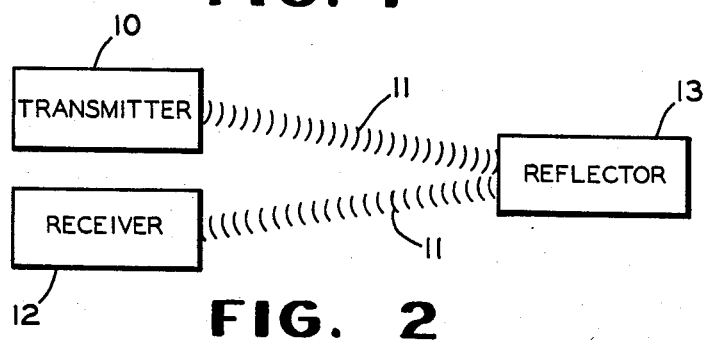
FIG. 2 is a block diagram of an alternate information transmission system for use in the present invention.

There is shown in FIG. 2 an alternate embodiment of the system shown in FIG. 1. The transmitter 10 generates a wave 11 which strikes a reflector 13. The reflected wave 11 is directed to the receiver 12.

The information transmission system shown in FIG. 1 is suitable for a warning device in which it is desired to locate the transmitter and receiver at different positions. For example, each hole on the golf course could be assigned a separate transmitter, transmitting on a different frequency, and the receiver 12 could be located on the golf cart and be tuneable to receive each of said frequencies selectively. In the alternative, as shown in FIG. 2, the transmitter 10 and the receiver 12 could be located at the same position such as a golf cart. A reflector 13 could be positioned at each of the holes to receive the energy 11 from the transmitter 10 and reflect it back to the receiver 12 on the golf cart. The energy 11 could be in the form of radar, sonar or laser beam, or any other suitable means of communication.

Figure 3:
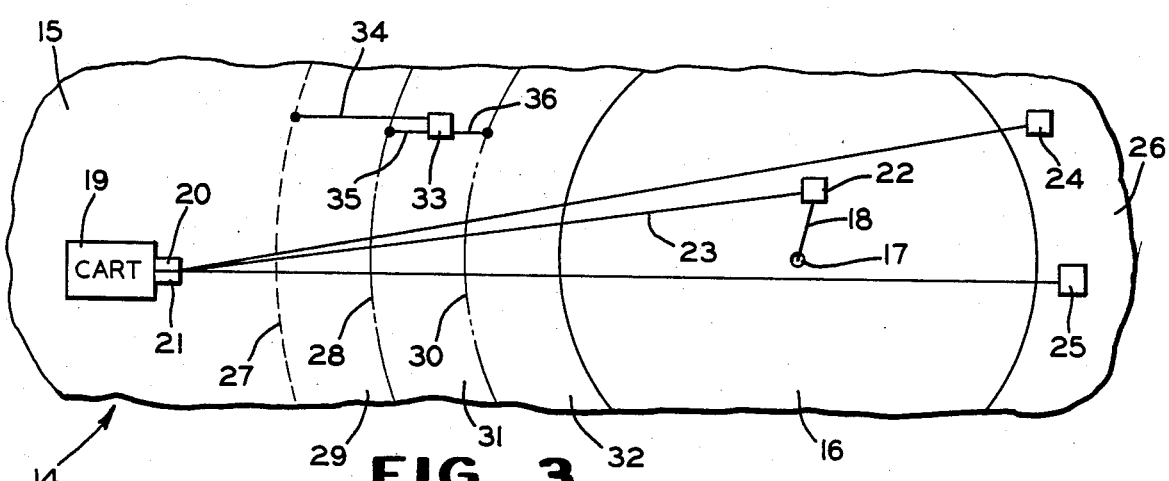
FIG. 3 is a schematic plan view of a golf course and a warning device according to the present invention.

There is shown in FIG. 3, a portion of a golf course 14 including a fairway 15 and a green 16. The green 16 has a hole 17 for receiving golf balls and a flag 18 removably extends from the hole 17. A golf cart 19 is shown as being on the fairway 15 approaching the green 16. The golf cart 19 has a transmitter 20 and a receiver 21 mounted thereon. In one embodiment, a reflector 22 can be mounted on the flag stick 18. Transmitter 20 generates an energy wave 23 which strikes the reflector 22 and is reflected back along the same path to the receiver 21. Such a system is similar to the information transmission system shown in FIG. 2.

If the reflector 22 were a transmitter instead, and only the receiver 21 were mounted on the cart 19, then the system would be similar to the information transmission system shown in FIG. 1.

The warning device according to the present system could be operated on either of two well known methods of obtaining distance information. In a first method, the length of time it takes for a signal to reach an object and return, is utilized to determine the distance to the object. Radar and sonar systems operate in this manner. The second method operates on the utilization of triangulation wherein, if the distance between two reflectors is known, the angle between the transmitter/receiver location and each of the reflectors will provide the information necessary to determine the distance to the reflectors. As shown in FIG. 3 a pair of reflectors 24 and 25 are positioned in an area 26 behind the green 16 as an alternative or a complement to the reflector 22. U.S. Pat. No. 4,225,226 discloses a laser guidance system which determines the position of an aircraft with respect to fixed reflectors and could be utilized in the present invention to provide location information.

As the cart approaches the green, it may be desirable to generate different signals depending upon how close the cart is to the green. For example, at a first distance from the green 16, a dashed line 27 represents an initial warning position wherein when the cart is, as shown, in front of the line 27, a warning signal will be generated indicating that the cart is in an allowable area. Between the line 27 and a single broken line 28 lies an area 29 in which an initial warning signal is to be generated. However, typically no damage would result if the cart were in this area. Between the line 28 and a double broken line 30, lies an area 31 in which it is not permissible to drive the cart 19. Between the line 30 and the green 16 is an area 32 which is similar to the green 16 in that the cart 19 should not be driven in this area.

In another embodiment of the present invention, a transmitter 33 could be connected to an antenna (not shown) buried along each of the lines 27, 28 and 30. Thus, the transmitter 33 could generate a different frequency output signal on each of the lines 34, 35 and 36 which are connected to the buried antennas along the lines 27, 28 and 30 respectively.

Figure 4:
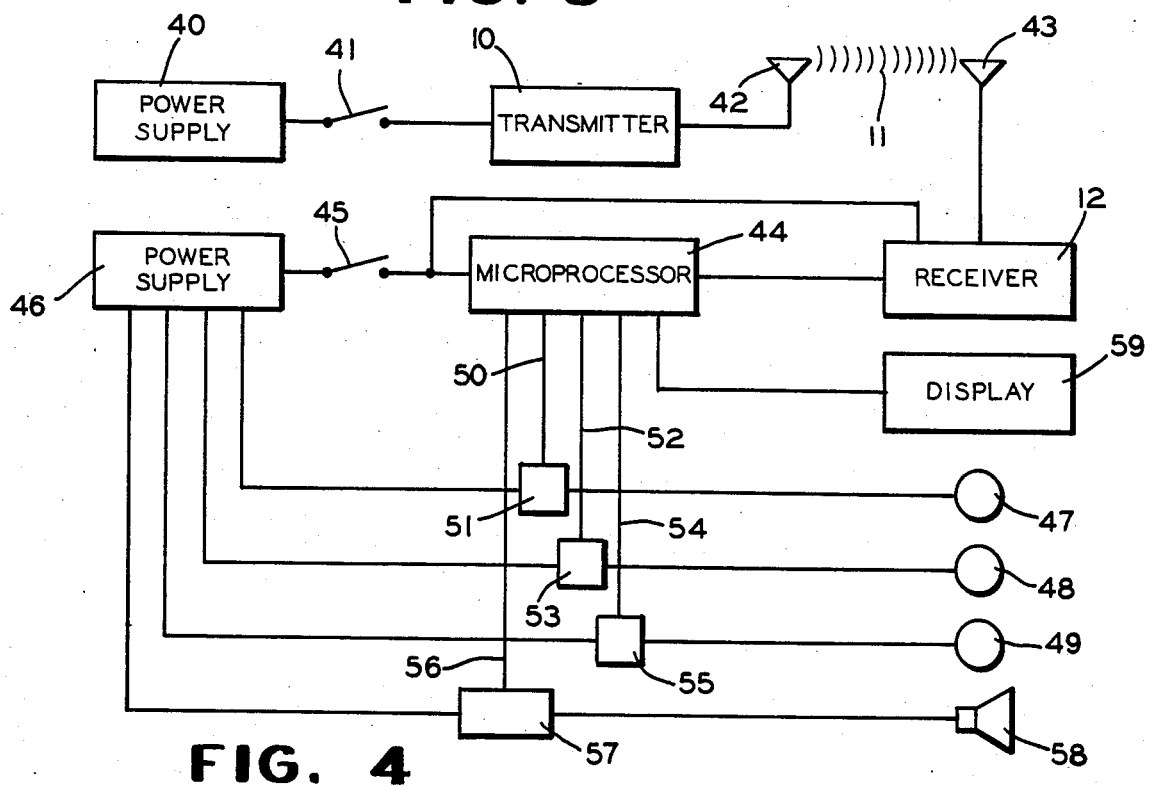
FIG. 4 is a schematic diagram of the warning device of FIG. 3 according to the present invention.

There is shown in FIG. 4 a block diagram of a warning device and control system according to the present invention. A transmitter 10 is connected to a power supply 40 through a switch 41. The switch 41 can be of any conventional type which is actuated either manually or remotely. The transmitter 10 generates an energy wave 11 from an antenna 42. The energy wave 11 is received by an antenna 43 connected to receiver 12. The information contained in the energy wave 11 is decoded by the receiver 12 and sent as an output signal to a microprocessor 44. The receiver 12 and the microprocessor 44 are connected through a switch 45 to a power supply 46. The microprocessor 44 controls a plurality of signal lights 47, 48 and 49 which indicate to the operator of the golf cart where the golf cart 19 is located in relation to the green 16. For example, an output line 50 from the microprocessor is connected to a control device 51 such as a transistor. An input to the transistor 51 is connected to the power supply 46 and an output from the transistor 51 is connected to the signal light 47. The signal light 47 can be a green lamp; for example, when the cart 19 approaches the line 27, the microprocessor 44 turns on the transistor 51 to connect the signal light 47 to the power supply 46.

When the cart 19 is between the lines 27 and 28 in the area 29, the microprocessor 44 generates a control signal on the control line 52 to a control input of the transistor 53. An input of the transistor 53 is connected to the power supply 46 and an output of the transistor 53 is connected to the signal light 48 which can be an amber lamp. The microprocessor 44 turns on the transistor 53 to connect the signal light 48 to the power supply 46 which light then glows amber to warn the operator of the cart 19 that he is approaching a restricted area. The microprocessor 44 also has an outlet connected to a control line 54 which in turn is connected to a control input of a transistor 55. An input of the transistor 55 is connected to the power supply 46 and an output of the transistor is connected to the signal light 49 which can be a red lamp. When the cart 19 is in the area 31 between the lines 28 and 30, the microprocessor 44 generates the control signal on the line 54 to turn on the transistor 55 thereby connecting the signal lamp 49 to the power supply 46. The signal lamp glows a steady red color to indicate that the cart has entered a restricted area and should be removed. When the cart 19 is inside the line 30 in the area 32 and/or on the green 16, the microprocessor 44 can generate a signal on the line 54 which alternately turns on and off the transistor 55. Thus, the red light 49 flashes to indicate that the cart is in a restricted area and should be removed immediately.

The microprocessor 44 also has an output connected to a line 56 which is an input to an amplifier 57. The amplifier 57 receives power from the power supply 46 and has an output connected to a speaker 58. At any predetermined position with respect to the green 16, the microprocessor can be directed to turn on the amplifier 57 and drive the speaker 58. Any suitable sound can be generated to indicate that the cart is in a restricted area.

The system shown in FIG. 4 can also display the distance between the cart and the hole 17 or any other reference position. An output from the microprocessor 44 is connected to a display 59 for generating a visual display of the distance between the cart 19 and the predetermined reference point, such as a reflector or a transmitter.

In accordance with the provisions of the patent statutes, the principle and mode of operation of the present invention has been explained and illustrated in its preferred embodiments. However, it must be appreciated that the present invention can be practiced otherwise than as specifically explained and illustrated without departing from its spirit or scope.

What is claimed is:

1. A warning device for indicating the position of a golf cart on a golf course with respect to a restricted area comprising:
   a transmitter for transmitting an energy wave;
   a receiver means mounted on a golf cart for receiving said energy wave and for generating an output signal representing the position of said golf cart with respect to a restricted area of a golf course on which the golf cart is located;
   a microprocessor means connected to said receiver means and responsive to said output signal for generating one of a plurality of control signals, each said control signal representing a different position of said golf cart with respect to said restricted area, a first one of said control signals representing an area where it is permissible to drive said golf cart, a second one of said control signals representing an area adjacent said restricted area and a third one of said control signals representing said restricted area; and
   an indicator means connected to said microprocessor means and responsive to said control signal for generating an indication of the position of said golf cart with respect to said restricted area wherein said indicator means includes first, second and third lamps responsive to said first, second and third control signals respectively.

2. The warning device according to claim 1 wherein said transmitter means transmits said energy wave as a radar signal and said receiver means is responsive to said radar signal energy wave.

3. The warning device according to claim 1 wherein said transmitter means transmits said energy wave as a sonar signal and said receiver means is responsive to said sonar signal energy wave.

4. The warning device according to claim 1 wherein said transmitter means transmits said energy wave as a laser beam and said receiver means is responsive to said laser beam energy wave.

5. The warning device according to claim 1 wherein said transmitter means, said receiver means and said indicator means are mounted on said associated golf cart.

6. The warning device according to claim 1 wherein said receiver means and said indicator means are mounted on said associated golf cart and said transmitter means is located at said restricted area.

7. The warning device according to claim 1 including a reflector means positioned at said restricted area for reflecting said energy wave transmitted by said transmitting means to said receiver means.

8. The warning device according to claim 1 wherein said first lamp is a green light, said second lamp is an amber light, and said third lamp is a red light.

9. The warning device according to claim 1 wherein said indicator means includes a digital visual display of the distance between said golf cart and said restricted area.

10. The warning device according to claim 1 wherein said indicator means includes an amplifier and speaker responsive to said control signal for generating an audible indication of the position of the golf cart with respect to said restricted area.

11. A method of warning an operator of a golf cart as to the position of the golf cart with respect to a restricted area on a golf course comprising the steps of:
   a. transmitting an energy wave containing information on the position of a golf cart with respect to a restricted area;
   b. generating one of a plurality of control signals in response to receiving said energy wave, each said control signal representing a different position of said golf cart with respect to said restricted area, a first one of said control signals representing an area where it is permissible to drive said golf cart, a second one of said control signals representing an area adjacent said restricted area and a third one of said control signals representing said restricted area; and
   c. generating an indication of the position of the golf cart with respect to the restricted area in response to said control signal utilizing first, second and third lamps responsive to said first, second and third control signals respectively.

12. The method according to claim 11 wherein step a. is performed by generating said energy wave from an antenna positioned in the restricted area.

13. The method according to claim 11 wherein step a. is performed by generating said energy wave from an antenna positioned on the golf cart to a reflector positioned in the restricted area.

14. The method according to claim 11 wherein step c. is performed by lighting one of a plurality of different colored lamps in response to said control signal.

* * * * *